United States Patent [19]

Choi

[11] Patent Number: 5,053,895
[45] Date of Patent: Oct. 1, 1991

[54] HEAD DRUM SERVO CONTROL METHOD FOR HIGH SPEED SEARCH IN MAGNETIC TAPE REGENERATING APPARATUS, AND DEVICE THEREOF

[75] Inventor: Kyeong-sun Choi, Seoul, Rep. of Korea

[73] Assignee: SamSung Electronics Co., Ltd., Kyung, Rep. of Korea

[21] Appl. No.: 396,105

[22] Filed: Aug. 21, 1989

[30] Foreign Application Priority Data

Dec. 17, 1988 [KR] Rep. of Korea ............... 88-16857

[51] Int. Cl.$^5$ .............................. G11B 5/52
[52] U.S. Cl. .................... 360/70; 360/73.05
[58] Field of Search .......... 360/70, 73.05, 73.06, 360/73.08, 10.1–10.3, 72.1–72.3

[56] References Cited

U.S. PATENT DOCUMENTS

| | | | |
|---|---|---|---|
| 4,626,936 | 12/1986 | Yoshino | 360/70 |
| 4,630,142 | 12/1986 | Tani et al. | 360/70 |
| 4,764,824 | 8/1988 | Tani et al. | 360/70 |
| 4,956,730 | 9/1990 | Arai et al. | 360/70 |

FOREIGN PATENT DOCUMENTS 63-153759 6/1988 Japan .

Primary Examiner—Aristotelis Psitos
Assistant Examiner—Steven R. Garland
Attorney, Agent, or Firm—Robert E. Bushnell

[57] ABSTRACT

A head drum servo control method for high speed searches in a magnetic tape regenerating apparatus and a device thereof are disclosed, the device comprising a head drum revolution speed voltage supplying means which consists of various specific means, the method comprising; a first step in which a constant relative speed voltage for the head relative to the tape and cosine and sine values of a constant inclination angle are set in advance; and a second step in which a head revolution speed voltage value is calculated in accordance with the variation of a tape running speed based on a specific formula. If the device and method of the present invention are adopted, the revolution velocity of the head drum can be rapidly started up during the transition from the normal regeneration to a high speed search.

4 Claims, 3 Drawing Sheets

HEAD DRUM SERVO CONTROL METHOD FOR HIGH SPEED SEARCH IN MAGNETIC TAPE REGENERATING APPARATUS, AND DEVICE THEREOF

FIELD OF THE INVENTION

The present invention relates to a head drum servo control method for a high speed search in a magnetic tape regenerating apparatus, and a method thereof, and particularly to a head drum servo control method and a device thereof, in which the start-up time can be shortened by controlling the revolution velocity of the head in accordance with the variations of the running velocity of the tape during a high speed search in a digital audio tape recorder.

BACKGROUND OF THE INVENTION

Generally, during a high speed search in a digital audio tape recorder, the running velocity of the tape is increased up to 200 times that of the normal playing velocity. But the head drum revolution velocity is not increased to 200 times in such a case, and therefore, the head drum revolution velocity has to be increased when the regeneration clock frequency becomes same as the normal regeneration frequency. It takes much time to increase the revolution velocity of the head drum, and therefore, the start-up time is extended, thereby making it impossible to carry out dexterous high speed searches.

FIG. 1 is a block diagram of the conventional head drum servo control device in which, during a high speed search, a reference frequency f1 is supplied to a frequency comparator 1, and a radio frequency (to be called hereinafter "RF") generated during the revolution of a head drum 6 is supplied to an RF amplifier 5. The RF amplifier 5 amplifies the RF signals, and these RF signals are supplied to the frequency comparator 1 through a phase locked loop 2 (to be called hereinafter PLL) for tracing the regeneration clock frequency. The frequency comparator 1 compares the incoming two signals, supplies output error signals to an adder 3, and supplies also to the adder 3 the output signals VH of a ramp voltage generator 7 for generating a ramp voltage during a search. The two kinds of signals inputted into the adder 3 are added together, and the added signals are amplified at a certain amplifying rate by an amplifier 4 in order to be outputted to the head drum 6. The head drum 6 is controlled to a revolution velocity equivalent to the driving voltage signal inputted therein. The ramp voltage generator 7 stops the voltage generation upon the receipt of control signals VC from the PLL 2 after being switched over to the normal running mode, and maintains the output voltage of the stopping moment.

As shown in FIG. 2 where the operating states of the reel and drum during a high speed search are illustrated, if the operation of a high speed search is started at a point a, then the point a shows the states of the drum control voltage VD and the reel control voltage VT corresponding to the variations of their revolution velocities. A point b is the point where the target level of the running velocity of the tape is attained, that is, the acceleration of the tape velocity is completed at the point b. A section c represents the interval where the revolution velocity of the head drum is subjected to a sweeping-up in order to control the relative velocity of the head drum at a constant level in correspondence with the acceleration of the reel velocity. A section f represents the interval where the revolution velocity of the head drum is subjected to a fine adjustment, while a point d represents the position where the revolution velocity of the drum is set.

That is, in the intervals c and f, controls are made in such a manner that the regeneration clock frequency of the regeneration data becomes same as the regeneration clock frequency of the normal running mode. The velocity of the head drum has to be increased until the two frequencies become equal each other, but the velocity of the head drum is increased in a state in which the head drum control voltage outputted from the ramp voltage generator 7 does not have any particular target level, and therefore, the interval c of FIG. 2 is lenghtily extended, thereby making the high speed search operation slow.

A servo control device for use in a digital audio tape recorder DAT is disclosed in Japanese Laying-opening No. Sho-63-153759. In the above invention, in order to overcome the image collapse in the transition from the normal regeneration to a high speed search, the revolution velocity of the head drum is increased step by step, and, in accordance with the variation of the revolution velocity of the head drum, the running velocity of the tape is servocontrolled by a constant relative velocity of the head drum, with the result that image collapse is prevented, and that the transition to a high speed search can be carried out.

However, while the image collapse can be prevented in the above described method, the start-up time becomes extended, and therefore, truly high speed searches are not realized.

SUMMARY OF THE INVENTION

The present invention is intended to overcome the disadvantages of the conventional technology.

Therefore, it is an object of the present invention to provide a head drum servo control method for a magnetic tape regenerating apparatus, in which the start-up time can be shortened through the reduction of the revolution velocity increase section by generating a voltage corresponding to the target velocity of the head drum in accordance with the variation of the running velocity of the tape during a high speed search of DAT.

It is another object of the present invention to provide a drum servo control device for magnetic tape regenerating apparatus, which is suitable for carrying out the above object of the present invention.

In achieving the above object, the method of the present invention is constituted as described below. That is, in a magnetic tape regenerating apparatus in which a servo control is carried out for a head drum capable of scanning the tape tracks in an inclined direction of a constant angle $\theta$ relative to the running direction of the tape, advance settings are made for the constant relative speed voltage value VR for the head speed relative to the tape running speed during a high speed search, and advance settings are also made for the cosine value ($\cos \theta$) and the sine value ($\sin \theta$) of the constant inclination angle $\theta$, while the head revolution speed voltage value VH is calculated based on the following formula in accordance with the variation of the tape running speed VT:

$$VH = VT\cos\theta + \sqrt{(VR^2 - VT^2 \sin^2 \theta)}$$

(where VT represents the tape running speed voltage value,) so that, in the case of a transition from the normal regeneration to a high speed search, the revolution velocity of the head drum should be rapidly started up.

In achieving the above object, the device of the present invention comprises:

a head drum for revolving a head capable of scanning the tape tracks in an inclined direction of a constant inclination angle $\theta$ relative to the running direction of the magnetic tape, that is, for revolving this head in accordance with a driving voltage supplied to it, and for generating RF signals correspondingly with the revolution velocity of the head;

an amplifier means for amplifying the RF signals;

a phase locked loop (PLL) means for generating compare clock signals correspondingly with the regeneration clock frequency after receipt of the RF signals amplified by the amplifier means;

a frequency comparing means for generating an error voltage VE after comparing the frequencies of the compare clock signals and the regeneration reference clock signals;

a means for supplying a head drum revolution speed voltage VH during a high speed search; and an adding and amplifying means for adding the error voltage VE and the head drum revolution speed voltage together, and for amplifying them in order to supply them in the form of the head drum driving voltage.

In the magnetic tape regenerating unit constituted as above, particularly, the means for supplying the head drum revolution voltage during a high speed search comprises:

a means for supplying a voltage corresponding to the cosine value (cos $\theta$) of the constant inclination angle $\theta$;

a means for supplying a voltage corresponding to the sine value (sin $\theta$) of the constant inclination angle $\theta$;

a means for supplying a constant relative speed voltage value VR for the head revolution speed relative to the running speed of the tape during a high speed search;

a means for calculating a tape running speed voltage value (VT cos $\theta$) of the tape direction tracks by computing the supplied tape running speed voltage value VT and the voltage value corresponding to the cosine value (cos $\theta$);

a means for calculating a relative speed voltage value ($\sqrt{(VR^2 - VT^2 \sin^2 \theta)}$) of the tape track direction by computing the supplied tape running speed voltage VT and the voltage value corresponding to the sine value (sin $\theta$) and the relative speed voltage value VR; and a means for calculating a head drum revolution speed voltage value VH by adding up the relative speed voltage value ($\sqrt{(VR^2 - VT^2 \sin^2 \theta)}$) of the tape track direction and the tape running speed voltage value (VT cos $\theta$) of the tape track direction.

BRIEF DESCRIPTION OF THE DRAWINGS

The above objects and other advantages of the present invention will become more apparent by describing the preferred embodiment of the present invention in more detail with reference to the attached drawings in which.

DESCRIPTION OF THE PREFERRED EMBODIMENTS

Figure 3:
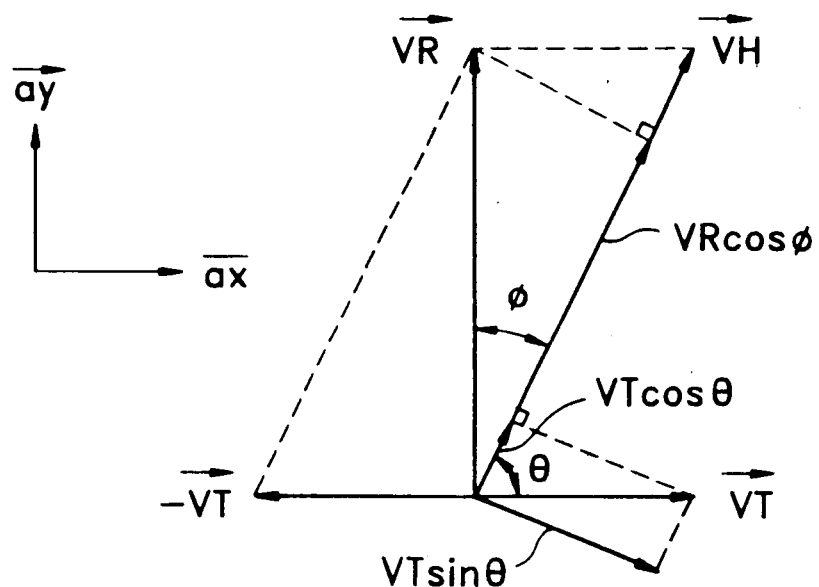
FIG. 3 is a vector graph of the relative velocity of the head relative to the running velocity of the tape for showing the method of the present invention.

FIG. 3 is a vector graph showing the principle of the present invention, in which the relative velocity of the head as against the running velocity of the tape during a high speed search operation can be defined by the formula, $\vec{VR} = \vec{VH} - \vec{VT}$. If the above velocity vectors $\vec{VH}$, $\vec{VT}$ are expressed in unit vectors $\vec{ax}$, $\vec{ay}$, then the following formula can be established.

$$\vec{VT} = VT.\vec{ax}$$

$$\vec{VH} = VH \cos \theta.\vec{ax} + VH \sin \theta.\vec{ay}$$

Therefore, the relative velocity vector can be defined as follows:

$$\vec{VR} = (VH \cos \theta - VT).\vec{ax} + VH \sin \theta.\vec{ay}$$

The above mentioned constant relative velocity servo means the absolute value of the constantly kept vector $\vec{VR}$, and therefore, the magnitude VR (absolute value) of the relative velocity vector $\vec{VR}$ can be defined as follows:

$$VR = \sqrt{(VT^2 + VH^2 - 2VH \cdot VT \cos\theta)}$$

If it is assumed that the absolute value VR of the relative velocity in the above formula is constant, then the formula for the relationship between the tape running speed VT and the head drum revolution speed VH can be arranged as shown below by taking the tape running speed VT as the independent variable and by taking the head drum revolution speed VH as the dependent variable:

$$VH^2 - 2VT.VH \cos \theta + VT^2 - VR^2 = 0$$

Therefore, the head drum revolution speed VH is obtained by the following formula:

$$VH = VT \cos \theta \pm \sqrt{(VR^2 - VT^2 \sin^2 \theta)} \tag{A}$$

In the above formula, $\theta$ represents the inclination of the tape track of the tape, or the inclination of the read line of the head, and is constant regardless of the running velocity of the tape. Further, in the above formula, making the relative speed VR constant is the purpose of the control, and therefore, if the relative speed VR is made to be constant, then the head speed VH in the above formula will be variable depending on the tape running speed VT.

Figure 1:
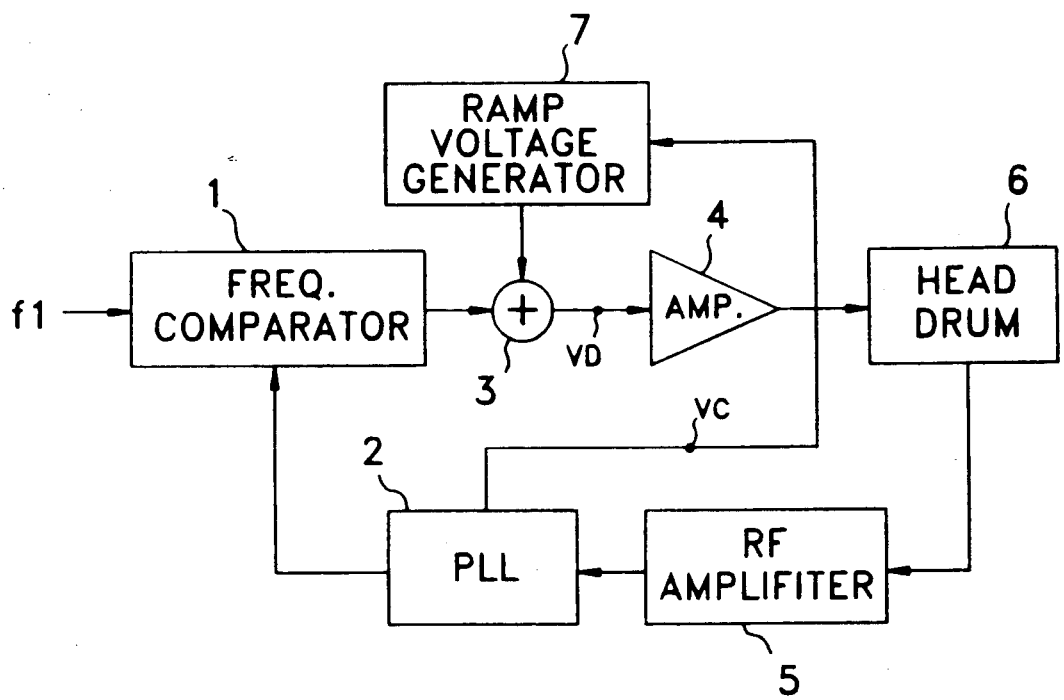
FIG. 1 is a block diagram of the conventional head drum servo control device for a high speed search.
Figure 2:
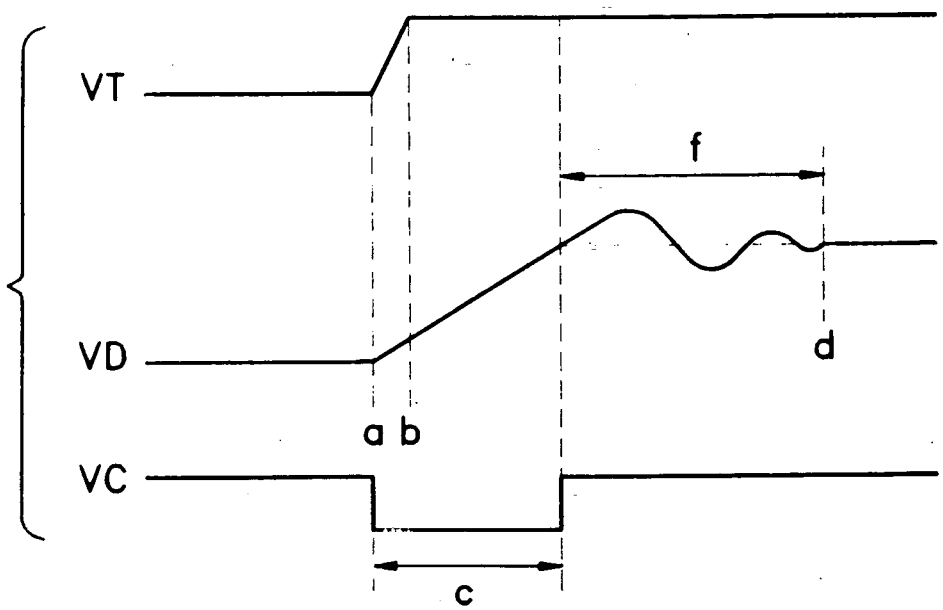
FIG. 2 is a graphical illustration of the voltages through the variations of the revolution velocity of the head drum installed in the device of FIG. 1.

Further, in the above formula, VT cos $\theta$ represents the value of the tape running speed of the tape track direction, while $\sqrt{(VR^2 - VT^2 \sin^2 \theta)}$ represents the value of the relative speed of the head of the tape track direction. That is, the relative speed value VR cos $\phi$ of the head of the tape track direction as shown in FIG. 2 can be obtained by the following formula:

$$VR\cos\phi = VR \cdot \sqrt{(1-\sin^2\phi)}$$
$$= VR \cdot \sqrt{\left(1 - \frac{VT^2 \sin^2\theta}{VR^2}\right)}$$
$$= \sqrt{(VR^2 - VT^2 \cdot \sin^2\theta)}$$

Therefore, according to the present invention, in the case of high speed search, the relative speed value VR of the head as against the tape is set in advance, and the cosine value and the sine value of the inclination angle $\theta$ of the scanning direction of the head relative to the tape are also set in advance, Then, in the case of a transition from the normal regeneration to a high speed search, the revolution velocity of the head drum can be calculated by the following process based on the above formula in accordance with the variation of the running velocity of the tape.

A first step is first carried out which is constituted such that the tape running speed and the cosine value are added together by taking their respective logs, and then VT cos $\theta$ is obtained by taking the antilog of the added-up value. That is, $$\log VT + \log \cos\theta = \log VT \cos\theta$$

$$\text{antilog}(\log VT \cos\theta) = VT \cos\theta$$

Then a second step is carried out which is constituted such that the respective logs of the tape running speed value and its sine value (sin $\theta$) are added together, this added-up value is multiplied to a double, and the value of $VT^2 \sin^2\theta$ is obtained by taking the antilog based on the following process:

$$\log VT + \log \sin\theta = \log VT \sin\theta$$

$$2 \log VT \sin\theta = \log(VT \sin\theta)^2$$

$$\text{antilog}\{\log(VT^2 \sin^2\theta)\} = VT^2 \sin^2\theta$$

A third step is carried out which is constituted such that the log of the relative speed value set as mentioned above is taken, its value is multiplied to a double, and the value of $VR^2$ is obtained by taking its antilog as follows:

$$2 \log VR = \log VR^2$$

$$\text{antilog}(\log VR^2) = VR^2$$

A fourth step is carried out which is constituted such that the terms $VR^2$ and $VT^2 \sin^2\theta$ of the second and third step are subtracted, the logs of these subtracted terms are taken, they are damped to one half, and the term $VR^2 - VT^2 \sin^2\theta$ is calculated by taking the antilog in the following manner:

$$VR^2 - VT^2 \sin^2\theta \rightarrow \log(VR^2 - VT^2 \sin^2\theta)$$

$$\tfrac{1}{2}\log(VR^2 - VT^2 \sin^2\theta) = \log(VR^2 - VT^2 \sin^2\theta)^{\frac{1}{2}}$$

$$\text{antilog}\{\log\sqrt{(VR^2 - VT^2 \sin^2\theta)}\} = \sqrt{(VR^2 - VT^2 \sin^2\theta)}$$

A fifth step is carried out which is constituted such that the two terms obtained respectively in the first and fourth steps are added together, and then the revolution speed of the head drum is calculated as follows:

$$VH = VT\cos\theta + \sqrt{(VR^2 - VT^2 \sin^2\theta)}$$

Figure 4:
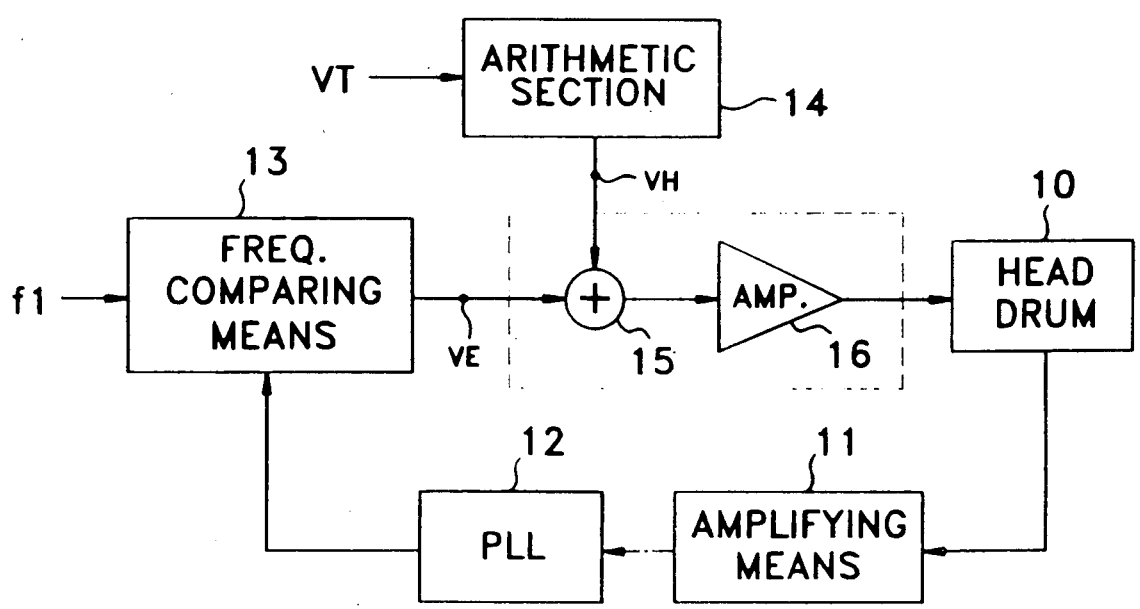
FIG. 4 is a block diagram of the head drum servo control device for a high speed search according to the present invention.

FIG. 4 is a block diagram of the head drum servo control device in a high speed search according to the present invention. In this drawing, a head drum 10 accommodates a head which scans the tape tracks in a constant inclination angle $\theta$ relative to the running direction of the tape. The head drum 10 is revolved by a driving voltage supplied thereto, and generates RF signals correspondingly with the revolution velocity of the head drum. The RF signals are amplified by an amplifying means 11, and then, are supplied to a PLL(phase locked loop) 12. After receipt of the RF signals, the PLL 12 outputs compare clock signals correspondingly with the frequency of the regeneration clock.

The compare clock signals are supplied to a frequency comparing means 13 in order to be compared with the frequency of regeneration reference clock signals, and the frequency comparing means 13 generates an error voltage VE corresponding to the frequency difference of the two signals.

Meanwhile, a voltage value VT for the reel revolution velocity which is proportionate to the running velocity of the tape is supplied to an arithmetic section 14 or a means for supplying a head drum revolution speed voltage during a high speed search. The arithmetic section 14 computes the head drum revolution speed according to the method of the present invention, and generates a head drum revolution speed voltage VH. The error voltage and the head drum revolution speed voltage VH are added together and amplified by an adder 15 and an amplifier 16 of the adding and amplifying means, and are supplied as the driving voltage of the head drum 10.

Figure 5:
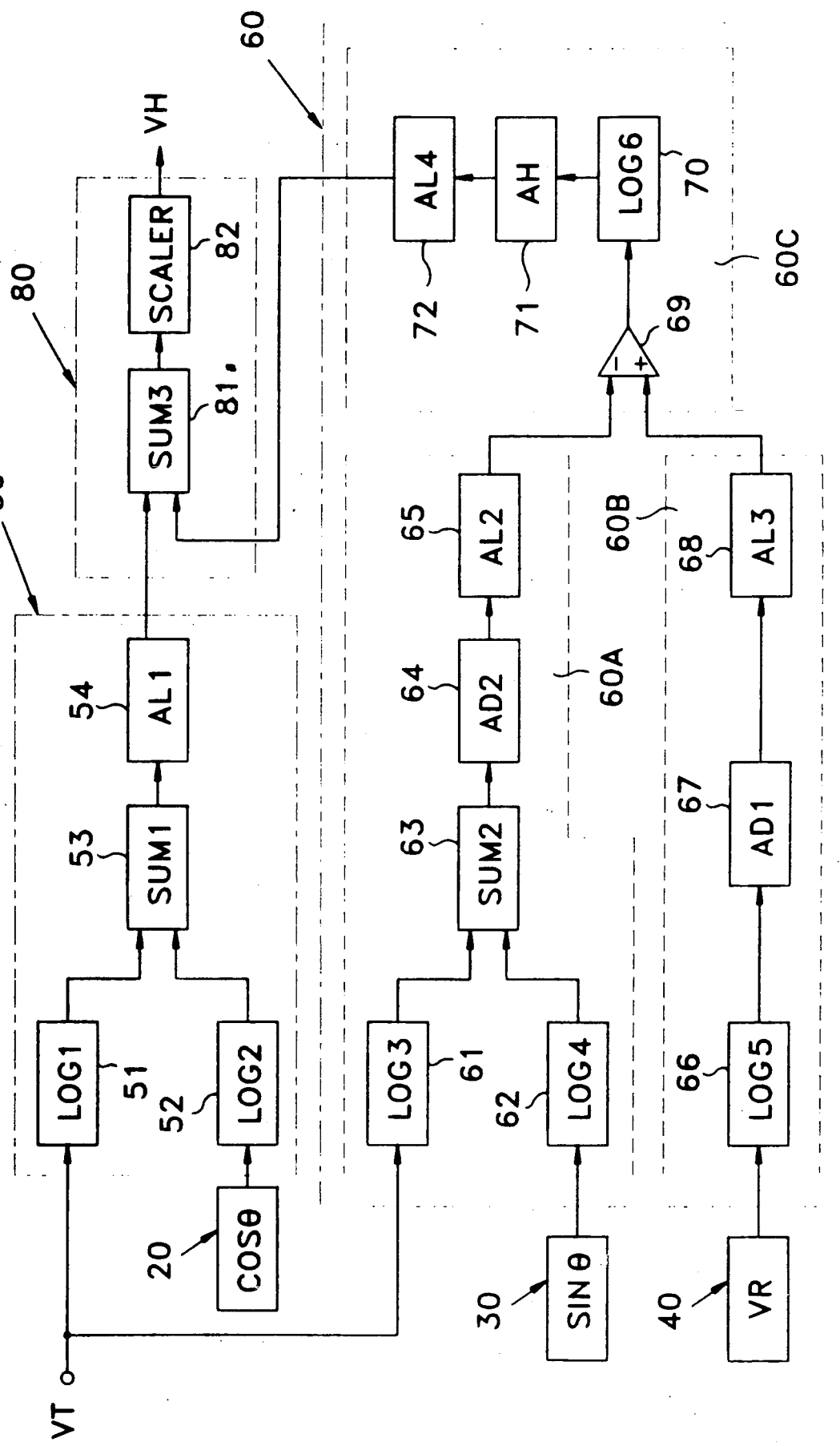
FIG. 5 is a specific circuital illustration of the arithmetic section of FIG. 4.

As shown in FIG. 5, the arithmetic section 14 or the means for supplying the head drum revolution speed voltage during a high speed search consists of: a means 20 for supplying a voltage corresponding to the cosine value (cos $\theta$) of the constant inclination angle $\theta$; a means 30 for supplying a voltage corresponding to the sine value (sin $\theta$) of the constant inclination angle $\theta$; a means 40 for supplying a constant head relative speed voltage VR, the head relative speed being constant relative to the speed of the tape during a high speed search; a means 50 for calculating the tape running speed voltage (VT cos $\theta$) of the tape track direction; a means 60 for calculating the relative speed voltage ($\sqrt{(VR^2 - VT^2 \sin^2\theta)}$) of the tape track direction, and for calculating the head drum revolution speed voltage VH.

The means 50 for calculating the tape running speed voltage of the tape track direction takes through log means 51,52 the respective logs for the voltage values corresponding to the tape running speed voltage VT and its cosine value (cos $\theta$); adds together the output signals of the log means at an adding means 53; and takes the antilog of the added signals at an antilog means 54, thereby calculating the tape running speed voltage (VT cos $\theta$) of the tape track direction and outputting the result.

The means 60 for calculating the head relative speed voltage ($\sqrt{(VR^2 - VT^2 \sin^2\theta)}$) of the tape track direction consists of: a means 60A for calculating the square term ($VT^2 \sin^2\theta$) for the tape running speed voltage (VT sin $\theta$) of the vertical direction relative to the tape tracks; a means 60B for calculating the square term $VR^2$ for the relative speed voltage; and a means 60C for subtracting the above two square terms and for taking a square root.

The means 60A which is for obtaining the square terms of the voltage of the tape running speed of the vertical direction relative to the tape track takes through respective log means 61,62 the respective logs for the voltage values corresponding to the tape running speed voltage value VT and the predetermined sine value (sin θ); adds up the output signals of the log means 61,62 through an adding means 63; amplifies the output signals of the adding means 63 through a double amplifying means 64; takes the antilog for the amplified signals through an antilog means 65; and obtains the value of the square term(VT$^2$ sin$^2$ θ).

The means 60B which is for obtaining the value of the square term of the relative speed voltage takes the log for the predetermined relative speed voltage VR through a log means 66; amplifies the output signals of the log means 66 through a double amplifying means 67 to output them; and takes the antilog for the amplified signals through an antilog means 68, thereby obtaining the value of the square term VR$^2$.

The means 60C which subtracts the above two square terms and takes the square root subtracts the above two square terms (VR$^2$ and VT$^2$ sin$^2$ θ) through a subtracting means 69; damps the output signals of the subtracting means 69 to one half through a damping means 71; and takes the antilog for the damped signals through an antilog means 72, thereby obtaining the value of the square root term ($\sqrt{(VR^2-VT^2 \sin^2 \theta)}$).

The means 80 which is for adding together the voltage value $\sqrt{(VR^2-VT^2 \sin^2 \theta)}$ of the relative speed and the voltage value (VT cos θ) of the tape running speed of the tape track direction and for calculating the head drum revolution speed voltage value VH consists of an adding means 81 and a scaler means 82 which is for adjusting the output signals of the adding means to a voltage suitable to the torque characteristics of a head drum motor.

The device of the present invention constituted as above will now be described as to its function and effect by referring to FIGS. 4 and 5.

The arithmetic section 14 shown in FIG. 4 is for calculating the head drum revolution speed voltage, and as a matter of convenience, the speed of the head, the running speed of the tape and the relative speed will be respectively assigned with reference codes VH, VT and VR which are also the reference codes of the head revolution control voltage, the reel revolution control voltage and the relative speed voltage respectively.

The arithmetic section 14 carries out the computation based on the above formula A after receipt of the reel revolution control signal VT, and outputs the computed results.

The head drum revolution control signals VH which is the result of the above operation is inputted into the adder 15 so that the signals VH mixed with the output signals of the frequency comparing means 13 should be outputted to the amplifier 16. The signals inputted into the amplifier 16 are amplified at a predetermined rate, and cause the revolution velocity of the head drum 10 to be varied.

Now the operation of the arithmetic section 14 will be described referring to FIG. 5. The multiplying process for the formula A will be described below by taking an example of a multiplying circuit. Assuming that A×B equals C in order to calculate A×B, if the logs for the both sides of the formals A×B=C, are taken, then the following relationships are obtained.

$$\log(AB) = \log C$$

$$\log(A) + \log(B) = \log C$$

$$C = \text{antilog}(\log C) = \text{antilog}(\log A + \log B)$$

Thus, two signals to be multiplied are added together through log circuits respectively, and then the antilog is taken to finally obtain the multiplied value. If the above formulas are applied to the arithmetic section 14, the reel revolution control signals VT inputted from the outside are outputted in the form of a log value of the reel revolution control signals VT through the first log means 51, while the constant cos θ is outputted in the form of a log value of the cos θ through the second log means 52. The two output signals of the first and second log means 51, 52 are inputted into a first adding means 53 to be added up there, and the added-up value signals are outputted to a first antilog means 54. The first antilog means 54 carries out an antilogging, and multiplies the reel revolution control signals VT by the constant cos θ to produce VT cos θ and to output it.

Further, the reel revolution control signals VT which are inputted from the outside will output a log value through a third log means 61, while the constant sin θ will output a log value through a fourth log means 62. The output signals of the third and fourth log means 61, 62 are inputted into a second adding means 63 from which signals formed by the combination of the above signals are outputted to the second amplifying means 64. The second amplifying means 64 amplifies the added-up signals to a double, and outputs them to a second antilog means 65 which carries out an antilogging for the signals. Then the second antilog means 65 multiplies the reel control signal VT by the constant sin θ to produce VT$^2$ sin$^2$ θ by squaring the multiplied value. The arithmetic procedure for producing VT$^2$ sin$^2$ θ is examplarily presented below.

$$(AB)^2 = C$$

$$\log(AB)^2 = \log C$$

$$2(\log A + \log B) = \log C$$

$$C = \text{antilog}(\log C) = \text{antilog}[2(\log A + \log B)]$$

Meanwhile, the constant VR from the relative speed voltage setting means 40 is inputted into a fifth log means 66 which outputs its log value which is inturn inputted into the second amplifying means 67. The second amplifying means 67 amplifies the inputted signals into a double, and outputs them to a third antilog means 68, while the third antilog means 68 subjects the inputted signals to an antilogging to output VR$^2$ by squaring the constant VR. The output signal of the second antilog means 65 and the output signal of the third antilog means 68 are inputted into a subtracting means such as a differential amplifier 69, and the log value of VR$^2$−VT$^2$ sin$^2$ θ which is the difference between the above two inputted signals is outputted to the means 71. The signal inputted into the damping means 71 is damped to ½, is subjected to an antilogging by a fourth antilog means 72 to be outputted in the form of $\sqrt{(VR^2-VT^2 \sin^2 \theta)}$. The arithmetic procedure for computing $\sqrt{(VR^2-VT^2\sin^2\theta)}$ is examplarily presented below.

$$B = A \rightarrow \log B = \tfrac{1}{2}\log A$$

$$B = \text{antilog}(\log B) = \text{antilog}(\tfrac{1}{2}\log A)$$

The output signal of the first antilog means 54 and the output signal of the fourth antilog means 72 are inputted into the third adding means 81 where the two signals are added together. The added-up signals from the third adding means 81 are inputted into the scaler means 82, and the input signal of the scaler means 82 is further adjusted so as for it to be suitable as a voltage for the torque characteristics of drum motor. After adjustment of the signal voltage, the scaler means 82 outputs a head drum revolution control signal VH by adopting $VT\cos\theta + \sqrt{(VR^2-VT^2\sin^2\theta)}$ after discarding the imaginary root $VT\cos\theta - \sqrt{(VR^2-VT^2\sin^2\theta)}$.

The arithmetic section 14 constituted as above can also be used in a DAT-data decoder.

As described above, the present invention is constituted such that, when the running velocity of the tape and the relative velocity of the head drum relative to the running velocity of the tape are to be controlled during a high speed search in a DAT, the control is carried out by calculating the head drum revolution velocity control voltage correspondingly with the running velocity of the tape, with the result that the start-up time can be shortened during the transition from the normal regeneration to a high speed search, and that the high speed search can be stabilized and can be made more rapid by maintaining the relative speed constant.

What is claimed is:

1. A head drum servo control method for a high speed search in a magnetic tape regenerating apparatus capable of servocontrolling the revolution speed of a head drum having a plurality of heads for scanning a plurality of tracks on the magnetic tape in an inclined direction of a constant inclination angle, comprising the steps of:

setting a voltage corresponding to a constant relative speed between each of the plurality of heads and the tape;

inputting a voltage corresponding to a tape running speed;

comparing a frequency generated in accordance with a revolution speed of the head drum with a reference frequency, so as to generate an error voltage corresponding to the difference of both frequencies;

generating a voltage corresponding to a head drum revolution speed to be controlled in accordance with a variation of the voltage corresponding to the tape running speed based on the following operation;

$$VH = VT\cos\theta + \sqrt{(VR^2-VT^2\sin^2\theta)}$$

wherein VT represents a voltage corresponding to a tape running speed, VR represents a voltage corresponding to a constant relative speed between the head and the tape, VH represents a voltage corresponding to a head drum speed to be controlled in accordance with the variation of the voltage corresponding to the tape running speed, and $\theta$ represents an angle at which the head traces the tape; and generating a driving signal for controlling the head drum speed by adding and amplifying said error voltage and said voltage corresponding to the head drum speed to be controlled.

2. A head drum servo control device for a high speed search in a magnetic tape regenerating apparatus comprising:

a head drum portion for revolving in accordance with a driving voltage a plurality of heads capable of scanning a plurality of tracks of the magnetic tape in a constant inclined direction having a constant inclination angle relative to the running direction of the magnetic tape, and for generating RF signals corresponding to the revolution speed of the heads;

an amplifying means for amplifying said RF signals;

a phase locked loop section for generating a comparing clock signal corresponding to a regeneration clock frequency after receipt of said amplified RF signals;

a frequency comparing means for generating an error voltage after comparing said comparing clock signal and regeneration reference clock signals;

means for supplying a voltage corresponding to a head drum revolution to be controlled; and adding and amplifying means for summing said error voltage and said head drum revolution voltage to be controlled for producing a summed voltage signal, and for amplifying said summed voltage signal, thereby controlling the head drum revolution speed, wherein said means for supplying the voltage corresponding to the head drum revolution to be controlled comprises;

means for supplying a voltage corresponding to a cosine value of said constant inclination angle at which a head traces the tape;

means for supplying a voltage corresponding to a sine value of said constant inclination value;

means for supplying a voltage corresponding to a constant head relative speed, said relative speed being constant relative to the tape;

means for receiving a voltage corresponding to a tape running speed and a voltage value corresponding to said cosine value, and then computing a voltage corresponding to a tape running speed component of the tape track direction;

means for receiving the voltage corresponding to the tape running speed, the voltage corresponding to said sine value and said voltage corresponding to the constant head relative speed and then computing a voltage corresponding to a constant head relative speed of the tape track direction; and means for receiving said voltage corresponding to the head relative speed of the tape track direction and said voltage corresponding to the tape running speed of the tape track direction, and then computing a voltage corresponding to the head drum revolution speed to be controlled.

3. The head drum servo control device for a high speed search as claimed in claim 2, wherein said means for computing said tape running speed component of the tape track direction comprises:

first and second logarithm calculation circuits for calculating logarithmic values of said voltage corresponding to said tape running speed and said voltage corresponding to said cosine value, respectively;

a first adder for summing said logarithmic values; and a first anti-logarithm calculation for calculating an anti-logarithmic value of said summed logarithmic value.

4. The head drum servo control device as claimed in claim 3, wherein said means for computing a voltage corresponding to a constant head relative speed of the tape track direction comprises:

third and fourth logarithm calculation circuits for respectively calculating logarithmic values of said voltage corresponding to said tape running speed and said voltage corresponding to said sine value;

a second adder for summing said logarithmic values outputted from said third and fourth logarithm circuits;

a first amplifier for amplifying said summed value by a gain of 2;

a second anti-logarithm calculation circuit for calculating an anti-logarithmic value of said summed logarithmic value outputted from said first amplifier;

a fifth logarithm calculation circuit for calculating a logarithmic value of said voltage corresponding to said constant head relative speed;

a second amplifier for amplifying the logarithmic value outputted from said fifth logarithm calculation circuit;

a third anti-logarithm calculation circuit for calculating an anti-logarithmic value of said amplified value outputted from said second amplifier to compute the square of said relative head speed;

a subtracter for subtracting the anti-logarithmic value outputted from said second anti-logarithm calculation circuit from the anti-logarithmic value outputted from said third logarithm calculation circuit;

a sixth logarithm calculation circuit for calculating a logarithmic value of the subtracted value outputted from said subtracter;

damping means for damping the output signal of said sixth logarithm calculation circuit by one half; and a fourth anti-logarithm calculation circuit for calculating an anti-logarithmic value of said damped value to compute the voltage corresponding to the relative head speed of the tape track direction.

* * * * *

UNITED STATES PATENT AND TRADEMARK OFFICE
CERTIFICATE OF CORRECTION

| | | Page 1 of 3 |
|---|---|---|
| PATENT NO. : | U.S. 5,053,895 | |
| DATED : | 1 October 1991 | |
| INVENTOR(S) : | Kyeong-sun CHOI | |

It is certified that error appears in the above-identified patent and that said Letters Patent is hereby corrected as shown below:

Column 1, Line 25, insert --the-- after "becomes";

Line 26, change "much" to --a considerable amount of--;

Line 42, delete "also";

Line 56, change "is started" to --starts--, and delete "a" (second occurrence);

Line 57, delete "the" (first occurrence), and change "states" to --state--;

Line 58, insert --state of the-- after "the";

Line 62, delete "the" (second occurrence);

Column 2, Line 6, insert --the-- after "becomes";

Line 8, change "has to" to --must--;

Line 9, insert --to-- after "equal";

Line 13, change "lenghtily" to --lengthily--;

Line 17, change "Laying-open" to --Laid open--;

Line 18, change "the above invention" to --Sho '759--;

UNITED STATES PATENT AND TRADEMARK OFFICE
CERTIFICATE OF CORRECTION

PATENT NO. : U.S. 5,053,895

DATED : 1 October 1991

INVENTOR(S) : Kyeong-sun CHOI

It is certified that error appears in the above-identified patent and that said Letters Patent is hereby corrected as shown below:

Column 2,     Line 22,     delete ",";

Line 30,     change "becomes" to --is--;

Line 46,     insert --a-- after "for";

Line 59,     change ", and advance" to --. Advance--;

Column 3,     Line 10,     change "," (first occurrence) to --;--;

Column 7,     Line 57,     change "inputted" to --input--;

Column 8,     Line 14,     change "inputted" to --input--;

Line 17,     change "outputted" to --output--;

Line 22,     change "outputted" to --output--;

Line 27,     delete "inputted";

Line 51,     change "inputted" to --input--;

Line 64,     change "outputted" to --output--;

UNITED STATES PATENT AND TRADEMARK OFFICE
CERTIFICATE OF CORRECTION

PATENT NO. : U.S. 5,053,895

DATED : 1 October 1991

INVENTOR(S) : Kyeong-sun CHOI

It is certified that error appears in the above-identified patent and that said Letters Patent is hereby corrected as shown below:

IN THE CLAIMS

Claim 2,   Column 10,   Line 16,   delete "an";

Line 21,   delete "a";

Line 34,   change ";" to --:--.

Signed and Sealed this

Twelfth Day of January, 1993

*Attest:*

DOUGLAS B. COMER

*Attesting Officer*        *Acting Commissioner of Patents and Trademarks*